United States Patent
Sodagar (10) Patent No.: US 11,539,776 B2
(45) Date of Patent: Dec. 27, 2022

(54) METHOD FOR SIGNALING PROTOCOL CHARACTERISTICS FOR CLOUD WORKFLOW INPUTS AND OUTPUTS

(71) Applicant: TENCENT AMERICA LLC, Palo Alto, CA (US)

(72) Inventor: Iraj Sodagar, Palo Alto, CA (US)

(73) Assignee: TENCENT AMERICA LLC, Palo Alto, CA (US)

(*) Notice: Subject to any disclaimer, the term of this patent is extended or adjusted under 35 U.S.C. 154(b) by 0 days.

(21) Appl. No.: 17/704,367

(22) Filed: Mar. 25, 2022

(65) Prior Publication Data

US 2022/0337646 A1  Oct. 20, 2022

Related U.S. Application Data

(60) Provisional application No. 63/176,799, filed on Apr. 19, 2021.

(51) Int. Cl.
| | |
|---|---|
| *H04L 67/10* | (2022.01) |
| *H04L 65/75* | (2022.01) |
| *H04L 65/70* | (2022.01) |
| *H04L 65/1101* | (2022.01) |
| *H04L 65/60* | (2022.01) |
| *H04L 65/65* | (2022.01) |
| *H04L 65/10* | (2022.01) |
| *G06F 9/48* | (2006.01) |

(52) U.S. Cl.
CPC .............. *H04L 65/75* (2022.05); *H04L 65/10* (2013.01); *H04L 65/1101* (2022.05); *H04L 65/60* (2013.01); *H04L 65/65* (2022.05); *H04L 65/70* (2022.05)

(58) Field of Classification Search
USPC ......................................................... 709/231
See application file for complete search history.

(56) References Cited

U.S. PATENT DOCUMENTS

| | | | | |
|---|---|---|---|---|
| 2020/0110633 | A1* | 4/2020 | Kolan | G06F 9/4806 |
| 2020/0177694 | A1* | 6/2020 | Kolan | H04L 65/65 |
| 2020/0304423 | A1* | 9/2020 | Sodagar | H04L 47/827 |

(Continued)

FOREIGN PATENT DOCUMENTS

WO   2020/188140 A1   9/2020

OTHER PUBLICATIONS

International Search Report dated Jul. 26, 2022 in International Application No. PCT/US2022/022135.

(Continued)

*Primary Examiner* — Jude Jean Gilles
(74) *Attorney, Agent, or Firm* — Sughrue Mion, PLLC (57) ABSTRACT

Systems and methods for managing a Network Based Media Processing (NBMP) workflow are provided. A method includes obtaining, from a descriptor corresponding to a network based media processing (NBMP) workflow, or a task included in the workflow, a syntax element indicating a protocol characteristic of a protocol corresponding to an input or an output of the workflow or the task, deriving the workflow based on the task; and managing at least one media processing entity according to the derived workflow, wherein the protocol characteristic relates to at least one from among a nonessentiality, a timing, an order, a number, a latency, and a size associated with the input or the output.

20 Claims, 5 Drawing Sheets

(56) References Cited

U.S. PATENT DOCUMENTS

| | | | |
|---|---|---|---|
| 2020/0341802 A1* | 10/2020 | Sodagar | G06F 9/50 |
| 2020/0341803 A1* | 10/2020 | Sodagar | G06F 9/5044 |
| 2020/0341806 A1* | 10/2020 | Sodagar | G06F 9/4881 |
| 2020/0341989 A1* | 10/2020 | Zhao | G06F 16/24578 |
| 2020/0344323 A1* | 10/2020 | Sodagar | H04L 67/63 |
| 2021/0105338 A1 | 4/2021 | Oyman et al. | |
| 2021/0211637 A1* | 7/2021 | Wang | H04N 21/85406 |

OTHER PUBLICATIONS

Written Opinion of the International Searching Authority dated Jul. 26, 2022 in International Application No. PCT/US2022/022135.
ISO/IEC JTC 1/SC 29/WG 11; N19062; Coding of moving pictures and audio Convenorship: UNI (Italy) "Text of ISO/IEC FDIS 23090-8 Network-based media processing"; Jan. 2020, pp. 105.

* cited by examiner

METHOD FOR SIGNALING PROTOCOL CHARACTERISTICS FOR CLOUD WORKFLOW INPUTS AND OUTPUTS

CROSS-REFERENCE TO THE RELATED APPLICATIONS

This application claims priority from U.S. Provisional Application No. 63/176,799, filed on Apr. 19, 2021, the disclosure of which is incorporated herein by reference in its entirety.

FIELD

Embodiments of the present disclosure are directed to Moving Picture Experts Group (MPEG) Network Based Media Processing (NBMP) and, more particularly, to managing an NBMP workflow.

BACKGROUND

MPEG Network Based Media Processing (NBMP) project has developed a concept of processing media on cloud. The NBMP Draft International Specification shows a great potential to increase media processing efficiency, faster and lower-cost deployment of media services, and the ability to provide large scale deployment by leveraging the public, private or hybrid cloud services.

While the NBMP current specification defines the general characteristics of any input or output of a workflow, it does not define the protocol characteristics.

SUMMARY

According to embodiments, a method performed by at least one processor includes obtaining, from a descriptor corresponding to a network based media processing (NBMP) workflow, or a task included in the NBMP workflow, a syntax element indicating a protocol characteristic of a protocol corresponding to an input or an output of the NBMP workflow or the task, deriving the NBMP workflow based on the task; and managing at least one media processing entity according to the derived workflow, wherein the protocol characteristic relates to at least one from among a nonessentiality, a timing, an order, a number, a latency, and a size associated with the input or the output of the NBMP workflow or the task.

According to embodiments, a workflow manager of a media system includes at least one memory storing program code: and at least one processor configured to read the program code and operate as instructed by the program code, the program code including: obtaining code configured to cause the at least one processor to obtain, from a descriptor corresponding to a network based media processing (NBMP) workflow, or a task included in the NBMP workflow, a syntax element indicating a protocol characteristic of a protocol corresponding to an input or an output of the NBMP workflow or the task, deriving code configured to cause the at least one processor to derive the NBMP workflow based on the task; and managing code configured to cause the at least one processor to manage at least one media processing entity according to the derived workflow, wherein the protocol characteristic relates to at least one from among a nonessentiality, a timing, an order, a number, a latency, and a size associated with the input or the output of the NBMP workflow or the task.

According to embodiments, a non-transitory computer-readable medium stores computer code that is configured to, when executed by at least one processor that implements a workflow manager of a media system, cause the at least one processor to: obtain, from a descriptor corresponding to a network based media processing (NBMP) workflow, or a task included in the NBMP workflow, a syntax element indicating a protocol characteristic of a protocol corresponding to an input or an output of the NBMP workflow or the task, derive the NBMP workflow based on the task; and manage at least one media processing entity according to the derived workflow, wherein the protocol characteristic relates to at least one from among a nonessentiality, a timing, an order, a number, a latency, and a size associated with the input or the output of the NBMP workflow or the task.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
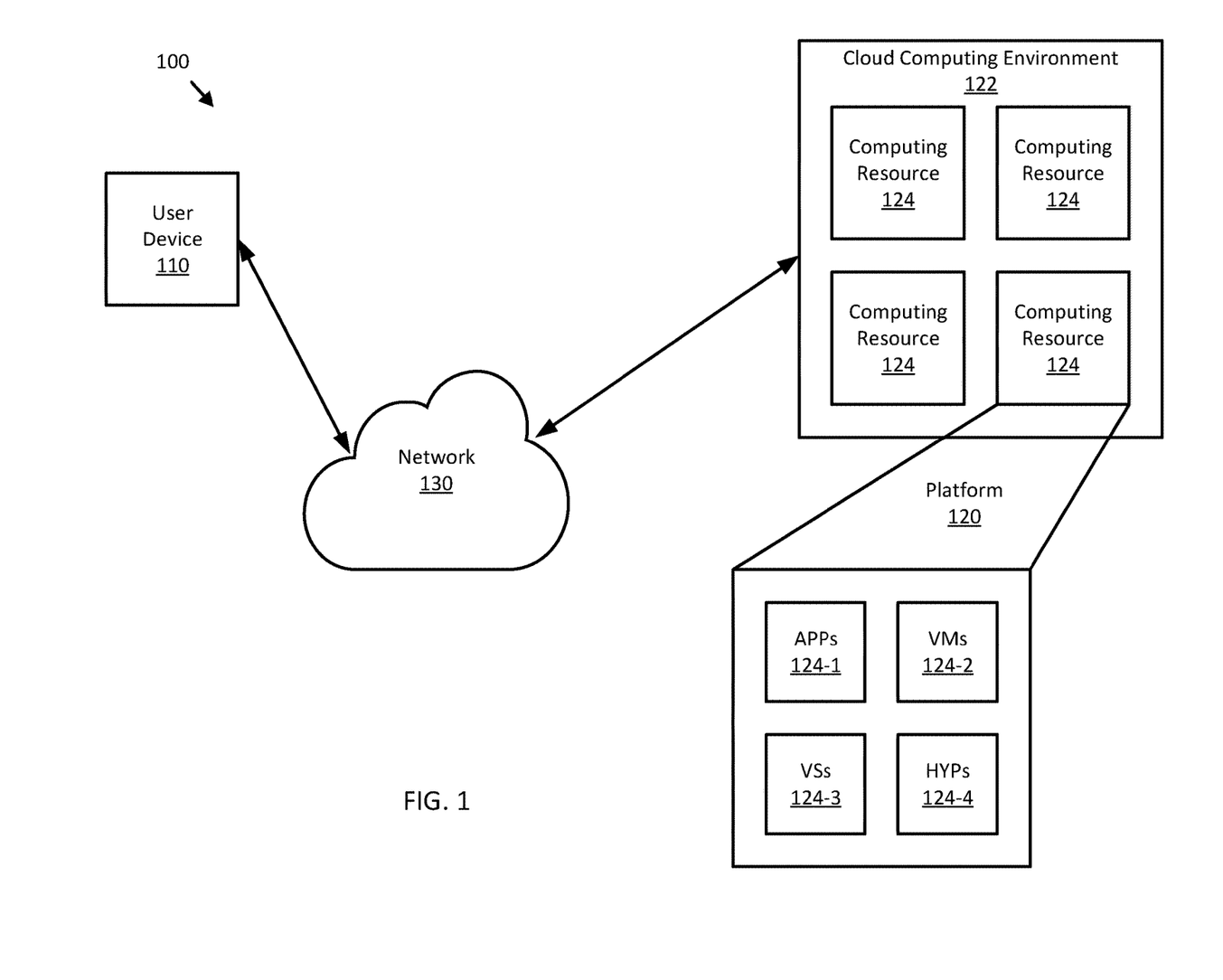
FIG. 1 is a diagram of an environment in which methods, apparatuses, and systems described herein may be implemented, according to embodiments.

FIG. 1 is a diagram of an environment 100 in which methods, apparatuses, and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g. a desktop computer, a laptop computer, a tablet computer, a handheld computer, a smart speaker, a server, etc.), a mobile phone (e.g. a smart phone, a radiotelephone, etc.), a wearable device (e.g. a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g. the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g. a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g. the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g. "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g. a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g. the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g. one or more devices) of the environment 100 may perform one or more functions described as being performed by another set of devices of the environment 100.

Figure 2:
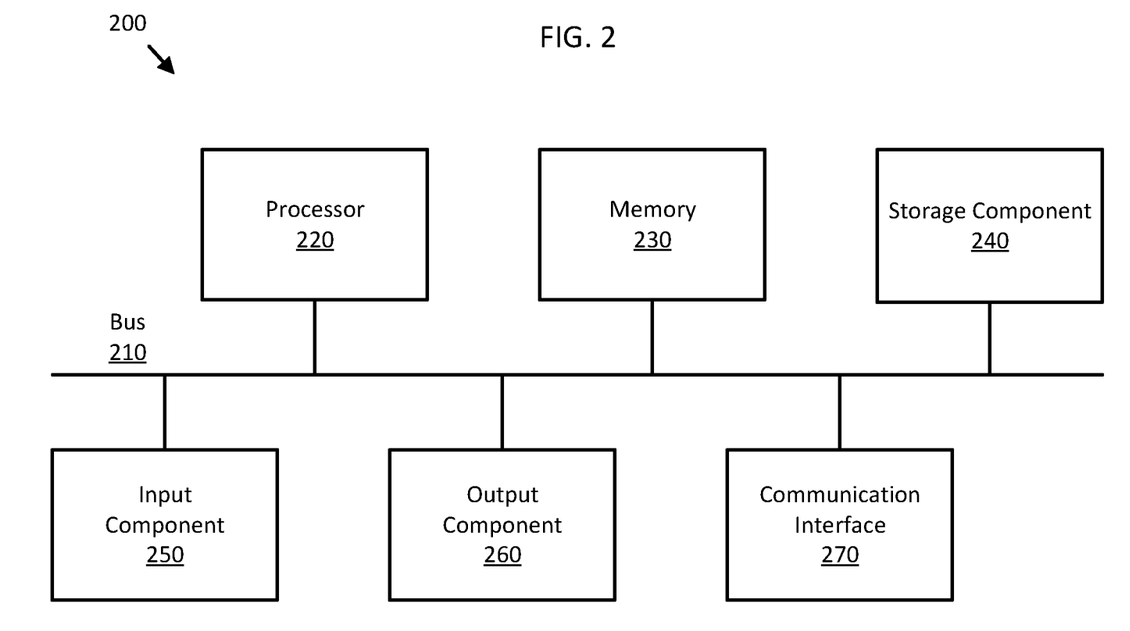
FIG. 2 is a block diagram of example components of one or more devices of FIG. 1.

FIG. 2 is a block diagram of example components of one or more devices of FIG. 1. The device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g. a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g. a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g. a touch screen display, a keyboard, a keypad, a mouse, a button, a switch, and/or a microphone). Additionally, or alternatively, the input component 250 may include a sensor for sensing information (e.g. a global positioning system (GPS) component, an accelerometer, a gyroscope, and/or an actuator). The output component 260 includes a component that provides output information from the device 200 (e.g. a display, a speaker, and/or one or more light-emitting diodes (LEDs)).

The communication interface 270 includes a transceiver-like component (e.g. a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g. one or more components) of the device 200 may perform one or more functions described as being performed by another set of components of the device 200.

Figure 3:
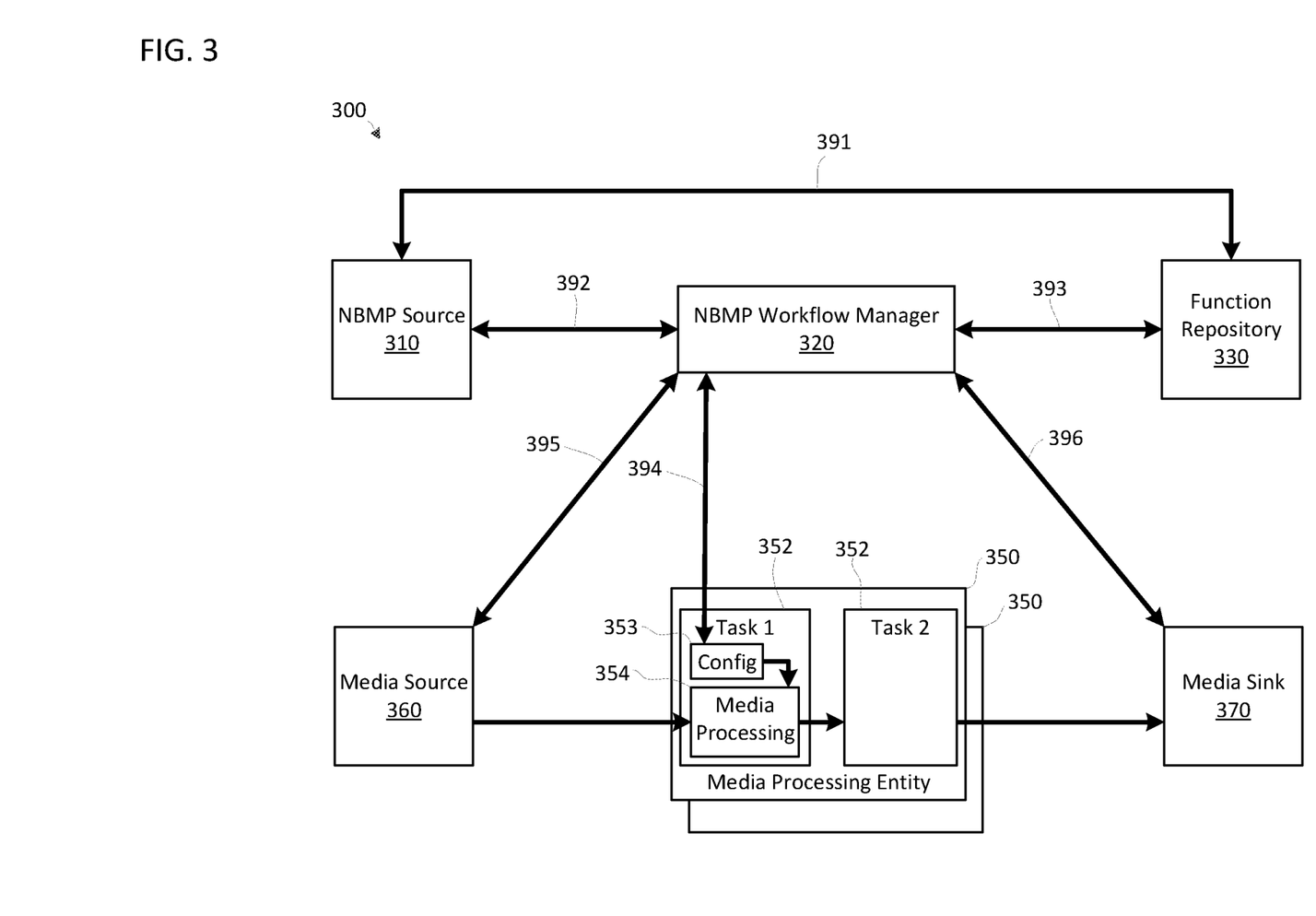
FIG. 3 is a block diagram of an NBMP system according to embodiments

In an embodiment of the present disclosure, an NBMP system 300 is provided. With reference to FIG. 3, the NBMP system 300 includes an NBMP source 310, an NBMP workflow manager 320, a function repository 330, one or more media processing entities 350, a media source 360, and a media sink 370.

The NBMP source 310 may receive instructions from a third party entity, may communicate with the NBMP workflow manager 320 via an NBMP workflow API 392, and may communicate with the function repository 330 via a function discovery API 391. For example, the NBMP source 310 may send a workflow description document(s) (WDD) to the NBMP workflow manager 320, and may read the function description of functions stored in the function repository 330, the functions being media processing functions stored in memory of the function repository 330 such as, for example, functions of media decoding, feature point extraction, camera parameter extraction, projection method, seam information extraction, blending, post-processing, and encoding. The NBMP source 310 may include or be implemented by at least one processor and memory that stores code configured to cause the at least processor to perform the functions of the NBMP source 310.

The NBMP source 310 may request the NBMP workflow manager 320 to create workflow including tasks 352 to be performed by the one or more media processing entities 350 by sending the workflow description document, which may include several descriptors, each of which may have several parameters.

For example, the NBMP source 310 may select functions stored in the function repository 330 and send the workflow description document to the NBMP workflow manager 320 that includes a variety of descriptors for description details such as input and output data, required functions, and requirements for the workflow. The workflow description document may include a set of task descriptions and a connection map of inputs and outputs of tasks 352 to be performed by one or more of the media processing entities 350. When the NBMP workflow manager 320 receives such information from the NBMP source 310, the NBMP workflow manager 320 may create the workflow by instantiating the tasks based on function names and connecting the tasks in accordance with the connection map.

Alternatively or additionally, the NBMP source 310 may request the NBMP workflow manager 320 to create workflow by using a set of keywords. For example, NBMP source 310 may send the NBMP workflow manager 320 the workflow description document that may include a set of keywords that the NBMP workflow manager 320 may use to find appropriate functions stored in the function repository 330. When the NBMP workflow manager 320 receives such information from the NBMP source 310, the NBMP workflow manager 320 may create the workflow by searching for appropriate functions using the keywords that may be specified in a Processing Descriptor of the workflow description document, and use the other descriptors in the workflow description document to provision tasks and connect them to create the workflow.

The NBMP workflow manager 320 may communicate with the function repository 330 via a function discovery API 393, which may be a same or different API from the function discovery API 391, and may communicate with one or more of the media processing entities 350 via an API 394 (e.g. an NBMP task API). The NBMP workflow manager 320 may include or be implemented by at least one processor and memory that stores code configured to cause the at least processor to perform the functions of the NBMP workflow manager 320.

The NBMP workflow manager 320 may use the API 394 to setup, configure, manage, and monitor one or more tasks 352 of a workflow that is performable by the one or more media processing entities 350. In an embodiment, the NBMP workflow manager 320 may use the API 394 to update and destroy the tasks 352. In order to configure, manage, and monitor tasks 352 of the workflow, the NBMP workflow manager 320 may send messages, such as requests, to one or more of the media processing entities 350, wherein each message may have several descriptors, each of which have several parameters. The tasks 352 may each include media processing functions 354 and configurations 353 for the media processing functions 354.

In an embodiment, after receiving a workflow description document from the NBMP source 310 that does not include a list of the tasks (e.g. includes a list of keywords instead of a list of tasks), the NBMP workflow manager 320 may select the tasks based on the descriptions of the tasks in the workflow description document to search the function repository 330, via the function discovery API 393, to find the appropriate functions to run as tasks 352 for a current workflow. For example, the NBMP workflow manager 320 may select the tasks based on keywords provided in the workflow description document. After the appropriate functions are identified by using the keywords or the set of task descriptions that is provided by the NBMP source 310, the NBMP workflow manager 320 may configure the selected tasks in the workflow by using the API 394. For example, the NBMP workflow manager 320 may extract configuration data from information received from the NBMP source, and configure the tasks 352 based on the configuration data.

The one or more media processing entities 350 may be configured to receive media content from the media source 360, process the media content in accordance with the workflow, that includes tasks 352, created by the NBMP workflow manager 320, and output the processed media content to the media sink 370. The one or more media processing entities 350 may each include or be implemented by at least one processor and memory that stores code configured to cause the at least processor to perform the functions of the media processing entities 350.

The media source 360 may include memory that stores media and may be integrated with or separate from the NBMP source 310. In an embodiment, the NBMP workflow manager 320 may notify the NBMP source 310 when a workflow is prepared and the media source 360 may transmit media content to the one or more of the media processing entities 350 based on the notification that the workflow is prepared.

The media sink 370 may include or be implemented by at least one processor and at least one display that is configured to display the media that is processed by the one or more media processing entities 350.

As discussed above, messages from the NBMP Source 310 (e.g. a workflow description document for requesting creation of a workflow) to the NBMP workflow manager 320, and messages (e.g. for causing the workflow to be performed) from the NBMP workflow manager 320 to the one or more media processing entities 350 may include several descriptors, each of which may have several parameters. In embodiments, communication between any of the components of the NBMP system 300 using an API may include several descriptors, each of which may have several parameters.

As discussed above, while the NBMP current specification defines the general characteristics of any input or output of a workflow, it does not defines the protocol characteristics.

According to embodiments, parameters such as protocol characteristics may be added to the NBMP specification.

For example, in embodiments, parameters such as those shown in Table 1 below may be used in an NBMP process.

TABLE 1

| | | | | | |
|---|---|---|---|---|---|
| mode | mode of transfer to/from input/output. Two values may be defined: "push" and "pull". For input, if this value is set to "push", this may mean that the data should be pushed to this input. Otherwise, the data may be pulled by this input. For output, if this value is set to "push", this may mean that the data is pushed from this output. Otherwise, the data may be pulled from this output. The default value may be "push". | N/A | | string | N/A |
| nonessentiality | If this value is set to the 'true', the input (output) may be not required (may be not available from time to time). The default value may be 'false'. | N/A | | boolean | N/A |
| between-request | Minimum possible duration between two issuedpushes(pulls) for an output (input), or minimum allowed duration between two issued pushes(pulls) for input(output) | milliseconds | number | | Unsigned integer |
| out-of-order | Maximum length of out of order push/pulls The default is 0. | N/A | | number | Unsigned integer |
| parallel-requests | Maximum number of push/pulls that is possible (allowed) for output/input (input/output). The default is 0. | N/A | | number | Unsigned integer |
| duration | Availability of data in milliseconds from the moment it appears in output when it is pulled. | milliseconds | number | | Unsigned integer |
| response-latency | Maximum time to response for a pull/push request. | milliseconds | number | | Unsigned integer |
| max-payload | Maximum size of a push request, or a response to pull request. | bytes | | number | Unsigned integer |

In Table 1 above, the portions indicated by italics may represent newly-added parameters according to embodiments. In embodiments, these parameters may be used in any appropriate NBMP element. For example, in embodiments the parameters of Table 1 may be included in an input descriptor or an output descriptor that may be included in, for example, a workflow description document (WDD), or a descriptor such as a task descriptor, or any other descriptor discussed herein.

As can be seen in Table 1, a protocol parameter or characteristic may include, for example, a "nonessentiality" parameter. In embodiments, if a value of this parameter is set to 'true', the input may be not required. In embodiments, if a value of this parameter is set to the 'true', the output may be not guaranteed to be available. The default value of this parameter may be 'false'.

As can be seen in Table 1, a protocol parameter or characteristic may include, for example, a "between-request" parameter. In embodiments, this parameter may specify a minimum possible duration between two issued pushes for an output, or a minimum allowed duration between two issued pushes for an input. In embodiments, this parameter may specify a minimum possible duration between two issued pulls for an input, or minimum allowed duration between two issued pulls for output.

As can be seen in Table 1, a protocol parameter or characteristic may include, for example, an "out-of-order" parameter. In embodiments, this parameter may specify a maximum length of out of order pushes or pulls. In embodiments, the default may be "0".

As can be seen in Table 1, a protocol parameter or characteristic may include, for example, a "parallel-requests" parameter. In embodiments, this parameter may specify a maximum number of pushes that is possible for output, a maximum number of pulls that is possible for input, a maximum number of pushes that is allowed for input, or a maximum number of pulls that is allowed for output. In embodiments, the default may be "0".

As can be seen in Table 1, a protocol parameter or characteristic may include, for example, a "duration" parameter. In embodiments, this parameter may specify an availability of data, for example in milliseconds, that it appears in output from a time when it is pulled.

As can be seen in Table 1, a protocol parameter or characteristic may include, for example, a "response-latency" parameter. In embodiments, this parameter may specify a maximum time to response for a pull request or a push request.

As can be seen in Table 1, a protocol parameter or characteristic may include, for example, a "max-payload" parameter. In embodiments, this parameter may specify a maximum size, for example a maximum payload size of a push request, or a response to pull request.

In embodiments, the parameter "nonessentiality" may correspond to a general characteristic of input and output, and may not directly relate to a specific protocol.

Accordingly, embodiments may relate to defining a set of parameters by which the general characteristics of a pull or push protocol may be defined for input/output of a workflow or task in an NMBP standard, wherein the frequency of the requests, the minimum duration between them, the possibility of parallel and/or out of order requests, and the maximum size of them, the response latency and the maximum payload size may be defined.

Embodiments may further relate a nonessentiality parameter for input and output of an NBMP workflow or task, wherein if this flag is set, this may mean that an availability of an input is not essential for the proper operation of the NBMP workflow or task, or that an output may not be available at some times and therefore it should not be counted on as an essential output for further processing or output of the NBMP workflow.

Figure 4:
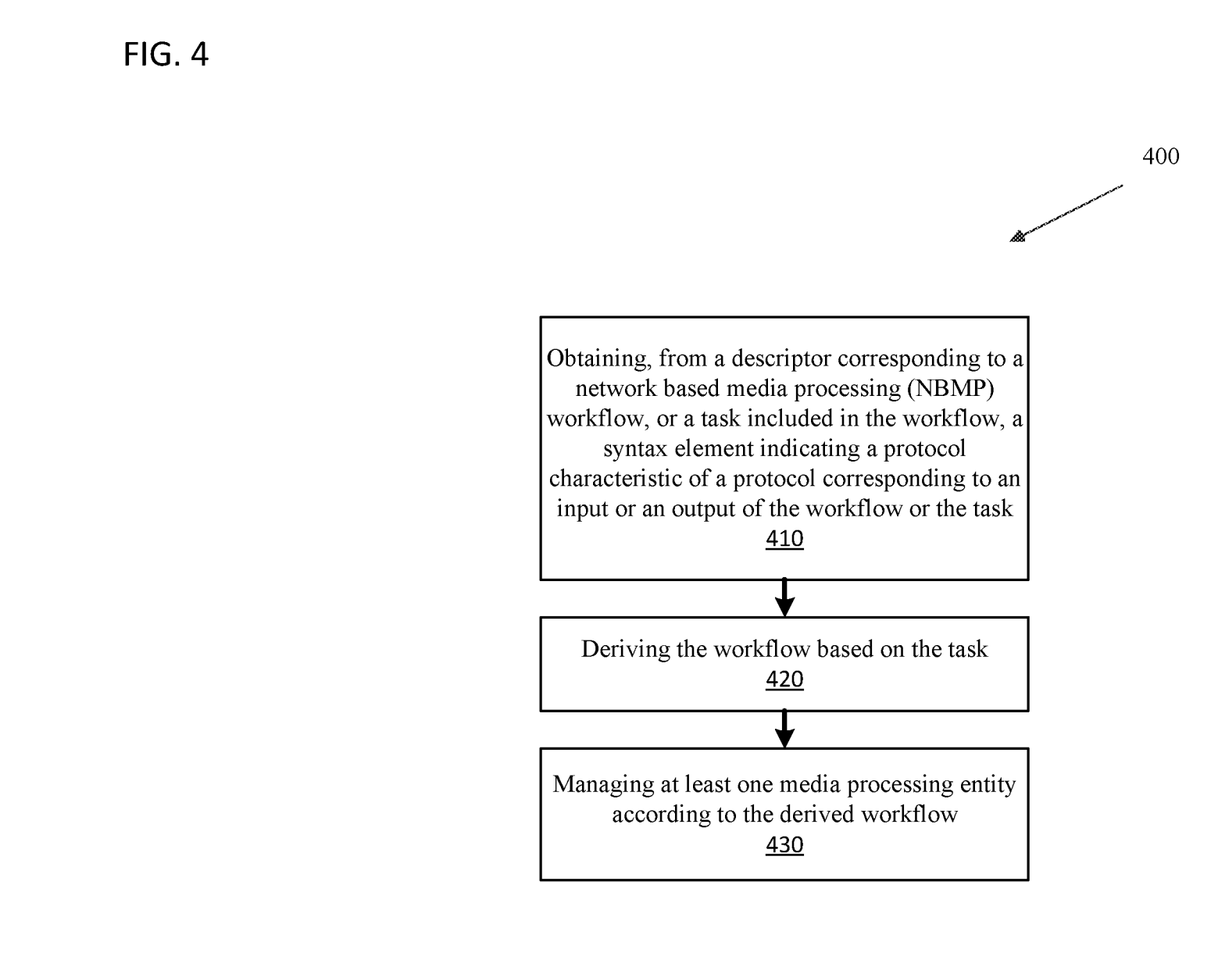
FIG. 4 is a block diagram of an example of a workflow management process according to embodiments.

With reference to FIGS. 3 and 4, a process 400 performed by the NBMP workflow manager 320 is described below.

FIG. 4 is a flowchart is a flowchart of an example process 400.

As shown in FIG. 4, process 400 may include obtaining, from a descriptor corresponding to a network based media processing (NBMP) workflow, or a task included in the NBMP workflow, a syntax element indicating a protocol characteristic of a protocol corresponding to an input or an output of the NBMP workflow or the task (block 410).

As further shown in FIG. 4, process 400 may include deriving the NBMP workflow based on the task (block 420).

As further shown in FIG. 4, process 400 may include managing at least one media processing entity according to the derived workflow (block 430).

In embodiments, the descriptor may be one from among an input descriptor corresponding to the NBMP workflow, an output descriptor corresponding to the NBMP workflow, an input descriptor corresponding to the task, or an output descriptor corresponding to the task.

In embodiments, the protocol characteristic may relate to the nonessentiality associated with the input or the output, wherein based on the protocol characteristic corresponding to the input, the protocol characteristic specifies that the input is not required for operation of the NBMP workflow or the task, and wherein based on the protocol characteristic corresponding to the input, the protocol characteristic specifies that the output is not guaranteed to be available.

In embodiments, the protocol characteristic may relate to the timing associated with the input or the output, wherein based on the protocol characteristic corresponding to the input, the protocol characteristic specifies a minimum possible duration between two issued pulls or a minimum allowed duration between two issued pushes, and wherein based on the protocol characteristic corresponding to the output, the protocol characteristic specifies a minimum possible duration between the two issued pushes or a minimum allowed duration between the two issued pulls.

In embodiments, the protocol characteristic may relate to the order associated with the input or the output, and the protocol characteristic may specify a maximum length of out of order pushes or pulls.

In embodiments, the protocol characteristic may relate to the number associated with the input or the output, wherein based on the protocol characteristic corresponding to the input, the protocol characteristic specifies maximum possible number of parallel pulls or a maximum allowed number of parallel pushes, and wherein based on the protocol characteristic corresponding to the output, the protocol characteristic specifies a maximum possible number of the parallel pushes or a maximum allowed number of the parallel pulls.

In embodiments, the protocol characteristic may relate to the timing corresponding to the input or the output, and based on the protocol characteristic corresponding to the input, the protocol characteristic may specify an amount of time before data is available after a pull.

In embodiments, the protocol characteristic may relate to the latency of the input or the output, and the protocol characteristic may specify a maximum time for a response to a push request or a pull request.

In embodiments, the protocol characteristic may relate to the size of the input or the output, and the protocol characteristic may specify a maximum size of a push request or a response to a pull request.

Although FIG. 4 shows example blocks of process 400, in some implementations, process 800 may include additional blocks, fewer blocks, different blocks, or differently arranged blocks than those depicted in FIG. 4. Additionally, or alternatively, two or more of the blocks of process 800 may be performed in parallel.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

According to embodiments of the present disclosure, at least one processor with memory storing computer code or program code may be provided. The computer code may be configured to, when executed by the at least one processor, perform any number of aspects of the present disclosure.

Figure 5:
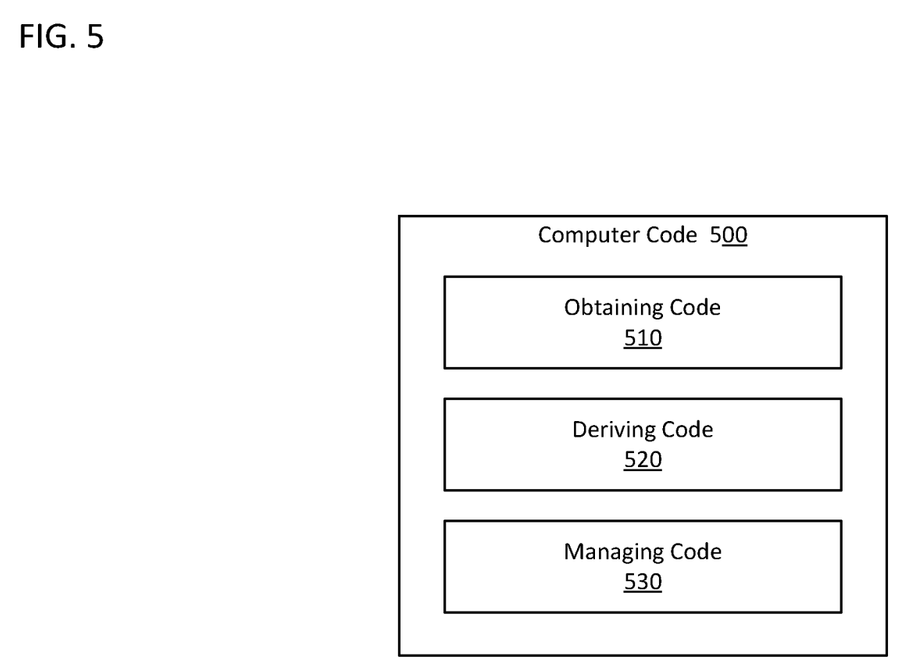
FIG. 5 is a block diagram of an example of computer code according to embodiments.

For example, with reference to FIG. 5, computer code 500 may be implemented in the NBMP system 300. For example, the computer code may be stored in memory of the NBMP workflow manager 320 and may be executed by at least one processor of the NBMP workflow manager 320. The computer code may include, for example, obtaining code 510, deriving code 520, and managing code 530.

In embodiments, the obtaining code 510, deriving code 520, and managing code 530 may be configured to cause the NBMP workflow manager 320 to perform the aspects of the process described above with reference to FIG. 4, respectively.

Embodiments of the present disclosure may be used separately or combined in any order. Further, each of the embodiments (and methods thereof) may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method performed by at least one processor, the method comprising:
obtaining, from a descriptor corresponding to a network based media processing (NBMP) workflow or a task included in the NBMP workflow, a syntax element indicating a protocol characteristic of a protocol corresponding to an input or an output of the NBMP workflow or the task,
deriving the NBMP workflow based on the task; and
managing at least one media processing entity according to the derived workflow,
wherein the protocol characteristic relates to at least one from among a nonessentiality, a timing, an order, a number, a latency, and a size associated with the input or the output of the NBMP workflow or the task.

2. The method of claim 1, wherein the descriptor is one from among an input descriptor corresponding to the NBMP workflow, an output descriptor corresponding to the NBMP workflow, an input descriptor corresponding to the task, or an output descriptor corresponding to the task.

3. The method of claim 1, wherein the protocol characteristic relates to the nonessentiality associated with the input or the output,
wherein based on the protocol characteristic corresponding to the input, the protocol characteristic specifies that the input is not required for operation of the NBMP workflow or the task, and
wherein based on the protocol characteristic corresponding to the input, the protocol characteristic specifies that the output is not guaranteed to be available.

4. The method of claim 1, wherein the protocol characteristic relates to the timing associated with the input or the output,
wherein based on the protocol characteristic corresponding to the input, the protocol characteristic specifies a minimum possible duration between two issued pulls or a minimum allowed duration between two issued pushes, and
wherein based on the protocol characteristic corresponding to the output, the protocol characteristic specifies a minimum possible duration between the two issued pushes or a minimum allowed duration between the two issued pulls.

5. The method of claim 1, wherein the protocol characteristic relates to the order associated with the input or the output, and
wherein the protocol characteristic specifies a maximum length of out of order pushes or pulls.

6. The method of claim 1, wherein the protocol characteristic relates to the number associated with the input or the output,
wherein based on the protocol characteristic corresponding to the input, the protocol characteristic specifies maximum possible number of parallel pulls or a maximum allowed number of parallel pushes, and
wherein based on the protocol characteristic corresponding to the output, the protocol characteristic specifies a maximum possible number of the parallel pushes or a maximum allowed number of the parallel pulls.

7. The method of claim 1, wherein the protocol characteristic relates to the timing corresponding to the input or the output, and
wherein based on the protocol characteristic corresponding to the input, the protocol characteristic specifies an amount of time before data is available after a pull.

8. The method of claim 1, wherein the protocol characteristic relates to the latency of the input or the output, and
wherein the protocol characteristic specifies a maximum time for a response to a push request or a pull request.

9. The method of claim 1, wherein the protocol characteristic relates to the size of the input or the output, and
wherein the protocol characteristic specifies a maximum size of a push request or a response to a pull request.

10. A workflow manager of a media system, the workflow manager comprising:
at least one memory storing program code; and
at least one processor configured to read the program code and operate as instructed by the program code, the program code including:
obtaining code configured to cause the at least one processor to obtain, from a descriptor corresponding to a network based media processing (NBMP) workflow, or a task included in the NBMP workflow, a syntax element indicating a protocol characteristic of a protocol corresponding to an input or an output of the NBMP workflow or the task,
deriving code configured to cause the at least one processor to derive the NBMP workflow based on the task; and
managing code configured to cause the at least one processor to manage at least one media processing entity according to the derived workflow,
wherein the protocol characteristic relates to at least one from among a nonessentiality, a timing, an order, a number, a latency, and a size associated with the input or the output of the NBMP workflow or the task.

11. The method of claim 1, wherein the descriptor is one from among an input descriptor corresponding to the NBMP workflow, an output descriptor corresponding to the NBMP workflow, an input descriptor corresponding to the task, or an output descriptor corresponding to the task.

12. The workflow manager of claim 10, wherein the protocol characteristic relates to the nonessentiality associated with the input or the output,
wherein based on the protocol characteristic corresponding to the input, the protocol characteristic specifies that the input is not required for operation of the NBMP workflow or the task, and
wherein based on the protocol characteristic corresponding to the input, the protocol characteristic specifies that the output is not guaranteed to be available.

13. The workflow manager of claim 10, wherein the protocol characteristic relates to the timing associated with the input or the output,
wherein based on the protocol characteristic corresponding to the input, the protocol characteristic specifies a minimum possible duration between two issued pulls or a minimum allowed duration between two issued pushes, and
wherein based on the protocol characteristic corresponding to the output, the protocol characteristic specifies a minimum possible duration between the two issued pushes or a minimum allowed duration between the two issued pulls.

14. The workflow manager of claim 10, wherein the protocol characteristic relates to the order associated with the input or the output, and
wherein the protocol characteristic specifies a maximum length of out of order pushes or pulls.

15. The workflow manager of claim 10, wherein the protocol characteristic relates to the number associated with the input or the output,
wherein based on the protocol characteristic corresponding to the input, the protocol characteristic specifies maximum possible number of parallel pulls or a maximum allowed number of parallel pushes, and
wherein based on the protocol characteristic corresponding to the output, the protocol characteristic specifies a maximum possible number of the parallel pushes or a maximum allowed number of the parallel pulls.

16. The workflow manager of claim 10, wherein the protocol characteristic relates to the timing corresponding to the input or the output, and
wherein based on the protocol characteristic corresponding to the input, the protocol characteristic specifies an amount of time before data is available after a pull.

17. The workflow manager of claim 10, wherein the protocol characteristic relates to the latency of the input or the output, and
wherein the protocol characteristic specifies a maximum time for a response to a push request or a pull request.

18. The workflow manager of claim 10, wherein the protocol characteristic relates to the size of the input or the output, and
wherein the protocol characteristic specifies a maximum size of a push request or a response to a pull request.

19. A non-transitory computer-readable medium storing computer code that is configured to, when executed by at least one processor that implements a workflow manager of a media system, cause the at least one processor to:
obtain, from a descriptor corresponding to a network based media processing (NBMP) workflow, or a task included in the NBMP workflow, a syntax element indicating a protocol characteristic of a protocol corresponding to an input or an output of the NBMP workflow or the task,
derive the NBMP workflow based on the task; and
manage at least one media processing entity according to the derived workflow,
wherein the protocol characteristic relates to at least one from among a nonessentiality, a timing, an order, a number, a latency, and a size associated with the input or the output of the NBMP workflow or the task.

20. The non-transitory computer-readable medium of claim 19, wherein the descriptor is one from among an input descriptor corresponding to the NBMP workflow, an output descriptor corresponding to the NBMP workflow, an input descriptor corresponding to the task, or an output descriptor corresponding to the task.

* * * * *